(12) United States Patent
Emmons, Jr. et al.

(10) Patent No.: US 6,343,210 B1
(45) Date of Patent: Jan. 29, 2002

(54) METHOD AND SYSTEM FOR SOFT DECISION PROPAGATION

(75) Inventors: Thomas Peter Emmons, Jr., Mesa, AZ (US); Robert Anthony Peters, Silver Spring, MD (US); James W. Startup, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/274,023

(22) Filed: Mar. 22, 1999

(51) Int. Cl.[7] ............................................... H04B 17/00
(52) U.S. Cl. ................... 455/226.3; 455/12.1; 455/427; 455/137; 375/227
(58) Field of Search ................. 455/12.1, 13.1–13.4, 455/226.3, 226.2, 427, 430, 504, 506, 134, 137, 67.1, 101, 522; 375/227, 261–262, 341, 347, 267; 370/206, 316–318

(56) References Cited

U.S. PATENT DOCUMENTS

| | | | | |
|---|---|---|---|---|
| 4,099,121 A | * | 7/1978 | Fang | 455/13.2 |
| 5,420,889 A | * | 5/1995 | Juntti | 455/245.1 |
| 5,621,764 A | * | 4/1997 | Ushirokawa et al. | 375/341 |
| 5,687,188 A | * | 11/1997 | Feeney et al. | 455/226.2 |
| 5,812,968 A | * | 9/1998 | Hassan et al. | 704/221 |
| 6,047,035 A | * | 4/2000 | Yellin | 455/504 |
| 6,049,566 A | * | 4/2000 | Saunders et al. | 455/12.1 |
| 6,091,933 A | * | 7/2000 | Sherman et al. | 455/13.1 |
| 6,185,716 B1 | * | 2/2001 | Riggle | 714/769 |
| 6,243,561 B1 | * | 6/2001 | Butler et al. | 455/458 |

FOREIGN PATENT DOCUMENTS

| | | |
|---|---|---|
| JP | 62189825 | 8/1987 |
| WO | WO9809387 | 3/1998 |

* cited by examiner

*Primary Examiner*—Vivian Chang
*Assistant Examiner*—Eliseo Ramos-Feliciano
(74) *Attorney, Agent, or Firm*—Dana B. Lemoine

(57) ABSTRACT

A method and apparatus for soft decision propagation trades off system bandwidth in return for link margin. When signal quality on an uplink is low, a satellite (20) sends soft decision data, rather than hard decision data, to a gateway (40). When path diversity exists on the uplinks, and multiple satellites (20) receive the uplink, multiple versions of soft decision data are sent to the gateway (40). The gateway combines the soft decision data resulting from multiple uplink paths, thereby increasing the effective uplink signal to noise ratio.

15 Claims, 4 Drawing Sheets

METHOD AND SYSTEM FOR SOFT DECISION PROPAGATION

FIELD OF THE INVENTION

This invention relates in general to communications systems and, in particular, to satellite communications systems with improved link margin.

BACKGROUND OF THE INVENTION

Signals in satellite communications systems endure channel effects that often degrade the quality of the signal. Signals which originate from subscriber units (SUs)are especially subject to channel effects, in part because of their limited power output.

Because communications channels experience interference, fading, and blockage, the ability to communicate reliably from an SU to a satellite can change over time. When channels are clear, the signal received at the satellite has a high signal-to-noise ratio (SNR), and the link margin is high. When channels are not clear, the received signal has a lower SNR, and the link margin is low. One simple method of increasing link margin is to increase the power level of the transmitted signal. Increasing power output from SUs can be undesirable, in part because battery life is reduced.

What is needed is a method and apparatus for improving the link margin in communications systems.

DETAILED DESCRIPTION OF THE DRAWINGS

The method and apparatus of the present invention provide for increased link margin on a communication link from an SU to a satellite, herein referred to as the "uplink," without increasing transmit power from the SU. By making intelligent decisions regarding the propagation of soft decisions at the expense of bandwidth, effective signal to noise ratio (SNR) of received uplink signals is increased without increasing SU transmit power. Spatial diversity of multiple satellites is utilized advantageously to receive multiple copies of the same uplink signal, and if necessary, soft decisions from the multiple copies of the uplink signal are sent to a gateway for combining, thereby resulting in an increased uplink SNR.

Figure 1:
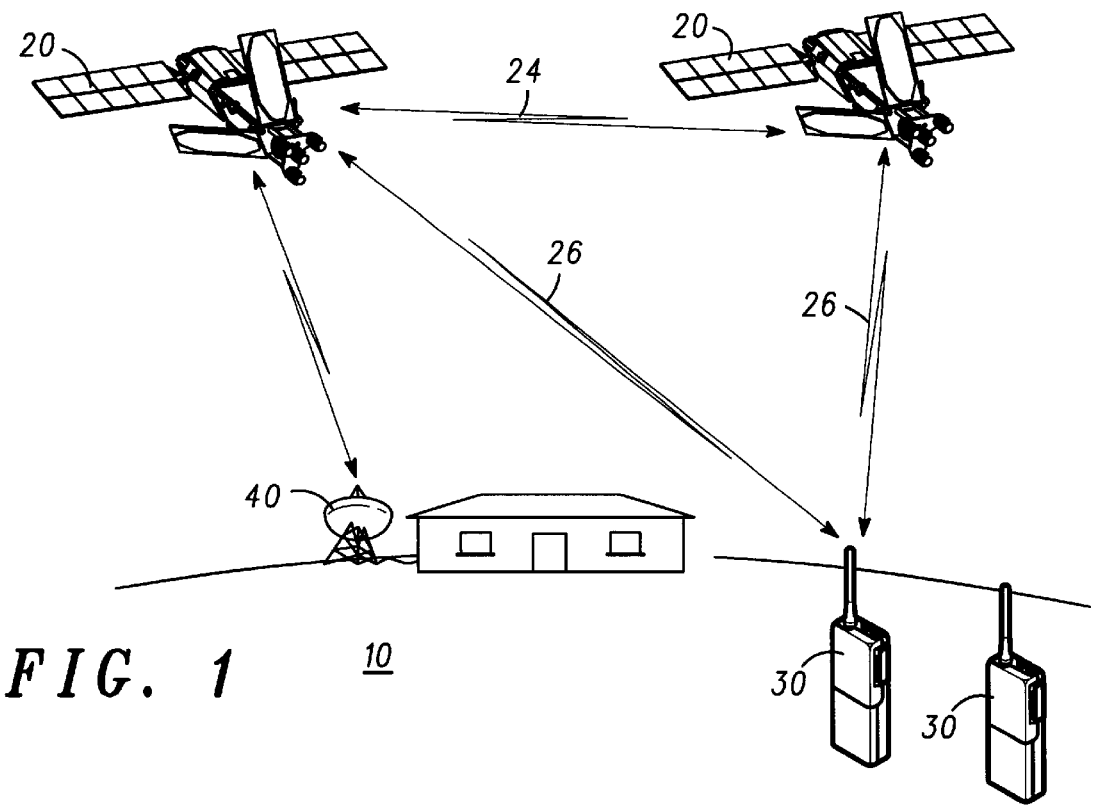
FIG. 1 shows a highly simplified diagram of a satellite communication system in accordance with a preferred embodiment of the present invention.

Turning now to the drawings in which like reference characters indicate corresponding elements throughout the several views, attention is first directed to FIG. 1. FIG. 1 shows a highly simplified diagram of satellite communication system 10. As shown in FIG. 1, communication system 10 comprises at least one satellite 20, any number of subscriber units 30, and at least one base station 40. Generally, satellites 20, subscriber units 30 and base station 40 of communication system 10 may be viewed as a network of nodes. All nodes of communication system 10 are, or may be in data communication with other nodes of communication system 10 through communication links. In addition, all nodes of communication system 10 are or may be in data communication with other communications devices dispersed throughout the world through public switched telephone networks (PSTNs) and/or conventional terrestrial communication devices coupled to a PSTN through conventional terrestrial base stations.

A "satellite" as used throughout this description means a man-made object or vehicle intended to orbit the earth. A "satellite" comprises geostationary, low-earth, medium-earth, and high-earth orbiting satellites and/or any combination thereof. A "constellation" means a number of satellites arranged in orbits for providing specified coverage (e.g., radio communication, remote sensing, etc.) of a portion, portions or all of the earth. A constellation typically includes multiple rings (or planes) of satellites and may have an equal number of satellites in each plane, although this is not essential.

The present invention is applicable to space-based communication systems having at least one satellite 20 in low-earth, medium-earth, high-earth, or geosynchronous orbit. Satellite 20 may be a single satellite or one of many satellites 20 in a constellation of satellites orbiting earth. The present invention is also applicable to space-based communication systems having satellites 20 which orbit earth at any angle of inclination including polar, equatorial, inclined or other orbital patterns. The present invention is applicable to systems where plural coverage of portions of the earth occur (i.e., more than one satellite is in view of a particular point on the earth's surface).

Each satellite 20 preferably communicates with other nearby satellites through cross-links 24 that form a backbone of space-based mobile communication system 10. Satellites 20 can also be arranged in a constellation without cross-links 24 so that all communications with satellites 20 originate from, and are sent to, the earth. The present invention is applicable in the presence of cross-links 24 and in the absence of cross-links 24.

Gateway 40 communicates with satellites 20. There may be multiple gateways 40 located at different regions on the earth. For example, there may be one gateway located in Honolulu, another gateway located in Los Angeles and another gateway in Washington, D.C. Another example is to have separate gateways located in each country on the earth. Gateways 40 receive from satellite 20 and/or transmit to satellites 20 voice and/or data. Gateways also communicate with other communications systems, such as the internet and PSTNs, thereby interconnecting subscriber units 30 with other earth-bound and non-earth-bound communications users. Communications from SUs 30 to gateways 40 typically travel on an uplink 26 from a subscriber unit to one or more satellites 20, and then from the one or more satellites 20 to a gateway 40.

The path from gateway 40 to SU 30 can exist simultaneously through multiple satellites. Since the demodulator for the multiple paths are colocated in a single SU, multiple techniques exist to combine the signal and improve the total SNR. The uplink, from SU 30 to gateway 40, is different. If demodulation occurs in gateway 40, and not in the satellite, the same techniques employed in SU 30 can be used. If demodulation occurs in physically separated entities, as in the satellites in FIG. 1, the problem is more difficult. Each satellite can make hard decision determinations and send those decisions to the gateway for combining. Or, each satellite can make soft decision determinations and at the expense of added bandwidth, send those soft decisions to the gateway for combining. This technique improves the SNR over sending the hard decisions. Normally, sending soft decisions will require 3 times the bandwidth on the satellite to gateway link over just sending hard decisions.

As is more fully described below with reference to the figures following FIG. 1, the method and apparatus of the present invention utilize the multiple signal paths from an SU to a gateway to increase the effective SNR on the uplink from an SU to a satellite while substantially minimizing the amount of bandwidth required on the satellite to gateway link. For example, when a signal emanating from an SU is received at multiple satellites, and the SNR of the received signals is relatively high, only the hard decisions are sent to the gateway. On the other hand, if the SNR of both received signals is relatively low, additional system bandwidth is utilized to propagate soft decisions from the multiple satellites to the gateway. The gateway then combines the soft decisions from the multiple satellites, thereby increasing the effective SNR of the uplink (the link from the SU to the satellite), and then the gateway generates hard decisions. In this manner, the system advantageously trades bandwidth for SNR when desirable to maintain link margins on the uplink.

Figure 2:
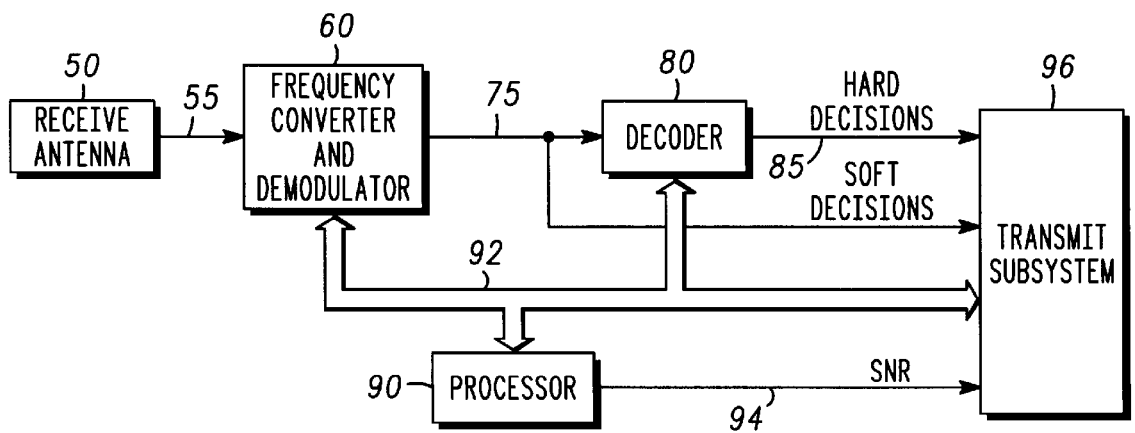
FIG. 2 shows a diagram of a communications node in accordance with a preferred embodiment of the present invention.

FIG. 2 shows a diagram of a communications node in accordance with a preferred embodiment of the present invention. Communications node 25 includes receive antenna 50, frequency converter and demodulator 60, decoder 80, transmit subsystem 96, and processor 90. Communications node 25 is preferably a satellite in communications system 10 (FIG. 1), such as satellite 20, but this is not a limitation of the present invention. Communications node 25 can also be a terrestrial node which communicates with another node, in the same manner as a satellite communicates with a gateway. For the purposes of explanation, and not in the way of limitation, communications node 25 is described herein as a satellite in the context of communication system 10.

Communications node 25 receives signals at receive antenna 50. Typically, received signals are those transmitted from subscriber units, such as subscriber units 30 (FIG. 1). Receive antenna 50 sends signal 55 to frequency converter and demodulator 60. The demodulated signal, represented as signal 75 in FIG. 2, is sent to both decoder 80 and to transmit subsystem 96. Decoder 80, which is typically a convolutional decoder, decodes the soft decisions to generate hard decisions 85. Hard decisions 85 are then sent to transmit subsystem 96.

Soft decisions generally include more information than hard decisions. For example, in a system which utilizes quadrature phase shift keying (QPSK), the soft decisions include quantized versions of the in-phase and quadrature components of the received signal, each comprising multiple bits of information, while the hard decisions include a single bit of information for each of the in-phase and quadrature components of the received signal. In a preferred embodiment where each of the in-phase and quadrature components are quantized to eight levels, each soft decisions symbol is represented by six bits, three bits for the in-phase component, and three bits for the quadrature component.

Communications node 25 includes processor 90. As shown in FIG. 2, processor 90 communicates with frequency converter and demodulator 60, decoder 80, and transmit subsystem 96. One skilled in the art will recognize that processor 90 can also communicate with one or more other subsystems while still practicing the present invention. Processor 90 receives from frequency converter and demodulator 60 a signal quality measurement of received signal 55. The signal quality measurement is typically the signal to noise ratio (SNR) of received signal 55. Alternatively, frequency converter and demodulator 60 can give processor 90 other information regarding the input signal, and processor 90 can compute a signal quality measurement. When the SNR is high, it is desirable to transmit hard decision data because the decisions are considered reliable and the transmission of hard decision data utilizes less bandwidth than the transmission of soft decision data. When the signal to noise ratio is low, communications node 25 transmits soft decision data. The soft decision data utilizes more bandwidth, but the increased information can be advantageously utilized by the gateway in a manner which is more fully described below. Processor 90, responsive to the signal quality of received signal 55, controls decoder 80 and transmit subsystem 96 resulting in the transmission of either hard decisions 85 or soft decisions 75. Processor 90 also sends SNR 94 to transmit subsystem 96. When transmit subsystem 96 transmits hard decision data, the SNR is also preferably transmitted.

Processor 90 performs decisions based on information received from frequency converter and demodulator 60, decoder 80, and transmit subsystem 96. Processor 90 preferably performs these decisions based on software with which it is programmed. In an alternate embodiment, processor 90 is replaced with dedicated circuitry, and no software is utilized. Advantages of processor 90 over dedicated circuitry include ease of design, and reconfigurability.

Frequency converter and demodulator 60 typically downconverts (in frequency) the received signal and demodulates the downconverted signal. Frequency conversion is not necessary prior to demodulation, as well known demodulation schemes exist which do not require frequency conversion. Frequency converter and demodulator 60 also includes an interface to processor 90 through which processor 90 obtains information regarding the signal quality of the received signal. Circuits for measuring SNR and for interfacing processors to other types of hardware are well known in the art, and are not further described here.

Transmit subsystem 96 typically includes one or more modulators, frequency converters, and signal combiners. Transmit subsystems which include these elements are well known in the art, and the specific implementation of transmit subsystem 96 is not important to the present invention.

Figure 3:
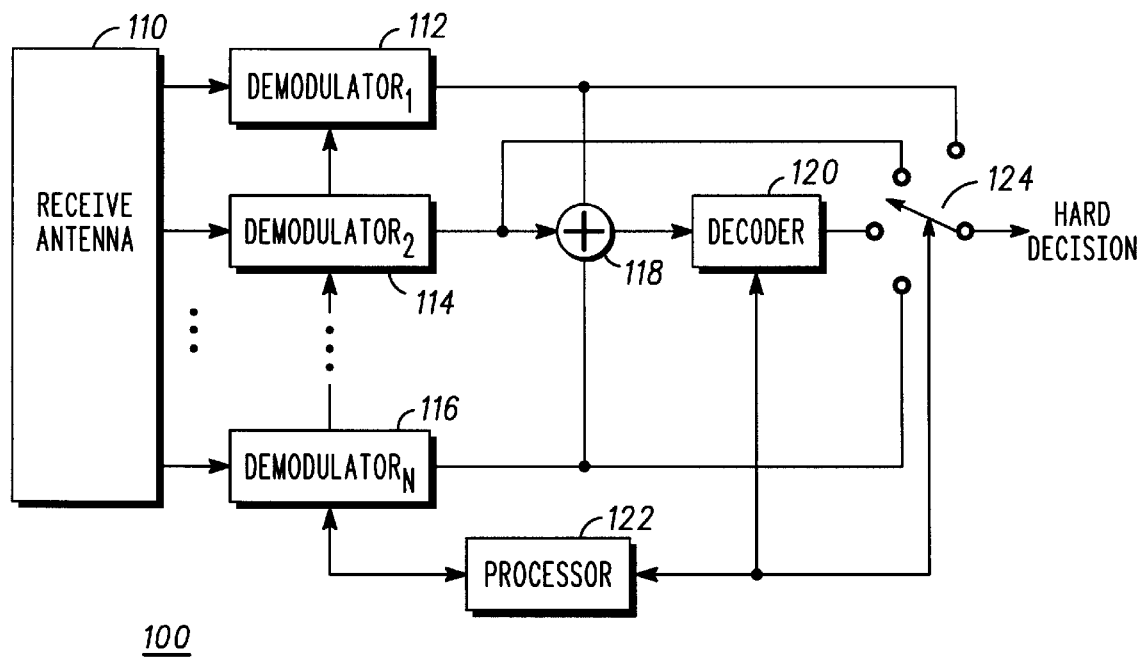
FIG. 3 shows a diagram of a gateway in accordance with a preferred embodiment of the present invention.

FIG. 3 shows a diagram of a gateway in accordance with a preferred embodiment of the present invention. Gateway 100 includes receive antenna 110, demodulators 112, 114, and 116, summer 118, decoder 120, and processor 122. Gateway 100 is preferably equivalent to gateway 40 as shown in FIG. 1. Gateway 100 receives signals from satellites, such as communications node 25 (FIG. 2). Because multiple satellites can function as a communications link between a single subscriber unit and gateway 100, gateway 100 is capable of receiving signals from multiple satellites, where each of those signals represent the same communication from a single subscriber unit. As is explained more fully below, each of these multiple signals can include either hard decisions or soft decisions as a function of processing which takes place in the satellites.

Gateway 100, as shown in FIG. 3, includes three demodulators. Any number of demodulators can be utilized while practicing the present invention, and gateway 100 is herein described as utilizing two demodulators. The use of two demodulators corresponds to receiving signals from two separate satellites. Processor 122 communicates with the demodulators and determines whether hard decision data or soft decision data has been received. When hard decision data is received, signal quality information is also received. Processor 122, as a function of the signal quality of the different signals, controls switch 124 such that the signal with the highest signal quality is selected to supply hard decision data. The signals not selected are preferably discarded. Gateway 100, when receiving hard decision data, also preferably notifies satellites that are transmitting data which is ultimately discarded to stop transmission, thereby saving bandwidth and power.

When soft decision data is received in all of the multiple signals, operation of gateway 100 is somewhat different. Each of the satellites transmitting soft decision data has done so because the signal quality from the subscriber unit to the satellite on the uplink was low. Gateway 100 effectively increases the signal quality by summing the soft decision data sent by each of the satellites. When processor 122 determines that soft decision data is being received, decoder 120 and switch 124 are controlled such that summer 118 sums the soft decision data from each of the demodulators, and decoder 120 convolutionally decodes the combined soft decision data to generate hard decisions. When soft decision data is represented by in-phase samples and quadrature samples, summer 118 comprises two summers in parallel, where one summer sums the in-phase components, and the other summer sums the quadrature components. Alternatively, summer 118 is a single physical summer which is time-multiplexed between the in-phase and quadrature components. By combining soft decision data at gateway 100, path diversity existing because of multiple satellites is utilized advantageously to increase the quality of the uplink from the subscriber unit to the satellite.

Figure 4:
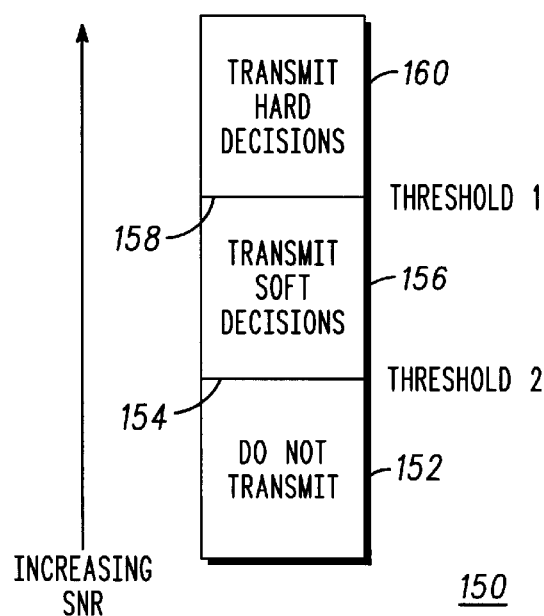
FIG. 4 shows a diagram of relative signal to noise ratios in accordance with a preferred embodiment of the present invention.

FIG. 4 shows a diagram of relative signal to noise ratios in accordance with a preferred embodiment of the present invention. The relative signal to noise ratios shown in diagram 150 correspond to thresholds used by communications node 25 (FIG. 2) when deciding whether to transmit hard decisions or soft decisions. A first threshold is shown as threshold 158. When a signal to noise ratio is above threshold 158, confidence is high that the hard decisions represent the correct decisions. In this case, corresponding to region 160 of diagram 150, hard decisions are transmitted from communications node 25. When a signal to noise ratio is below threshold 158 and above threshold 154, the confidence that the hard decisions represent the correct decisions is not as high. In this case, corresponding to region 156 of diagram 150, soft decisions are transmitted from communications node 25, thereby trading off the use of more bandwidth for the possibility of increased signal to noise ratio at the gateway. When a signal to noise ratio is below the second threshold 154, communications node 152 does not transmit at all because even the soft decisions are of little value.

Figure 5:
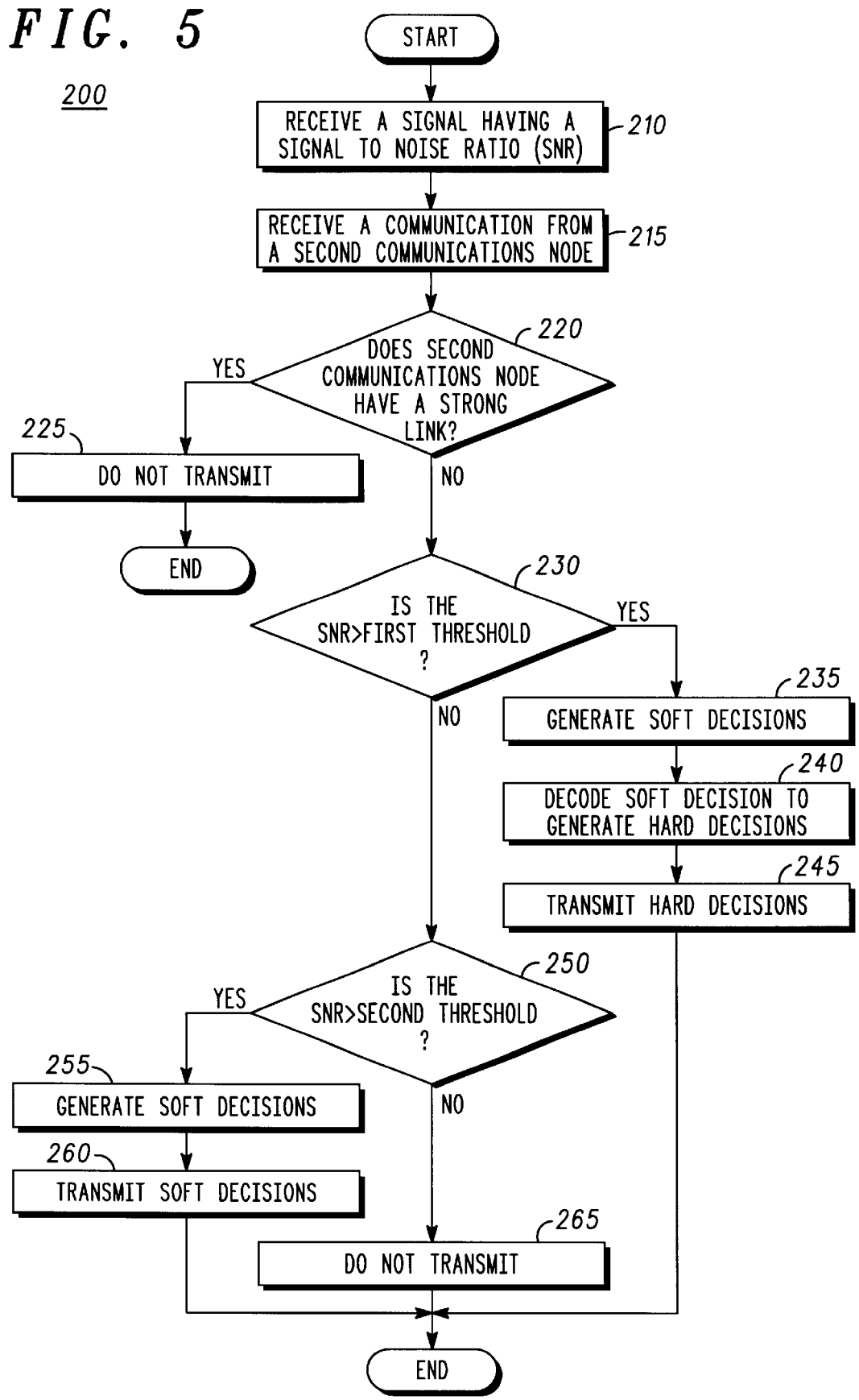
FIG. 5 shows a flow chart of a method of operating a communications node in accordance with a preferred embodiment of the present invention.

FIG. 5 shows a flow chart of a method of operating a communications node in accordance with a preferred embodiment of the present invention. Method 200 is preferably performed by a satellite such as communications node 25. Method 200 begins with step 210 when a signal is received that has a corresponding signal to noise ratio. The signal received in step 210 preferably corresponds to a signal received from a subscriber unit over a communications link (uplink) which sometimes exhibits a low link margin. It is desirable, therefore, to increase the signal quality of the received signal, thereby effectively increasing the link margin.

As previously described, it is possible that multiple satellites received a signal from the same subscriber unit. It is also possible for a satellite receiving a very strong uplink signal to notify other satellites not to transmit their received uplink signals, thereby saving bandwidth. This operation is shown in step 215 wherein a communication is received from a second communications node, and step 220 where the communication is queried to determine if the second communications node has received a strong uplink signal. If the second communications node has received a strong uplink signal, it is desirable for the communications node performing method 200 to not transmit. This is shown in step 225.

When, in step 220, it is determined that a second communications node has not received a strong uplink signal, method 200 continues with step 230. Steps 230 and 250 correspond to the comparison of the received signal quality against the thresholds 158 and 154 (FIG. 4) respectively. When, in step 230, it is determined that the signal to noise ratio is greater than the first threshold, then method 200 proceeds to transmit hard decisions. First soft decisions are generated in step 235, then the soft decisions are decoded to generate hard decisions in step 240, and then the hard decisions are transmitted in step 245.

When, in step 230, it is determined that the signal to noise ratio is less than the first threshold, processing proceeds with step 250 where the signal to noise ratio is compared to the second threshold. This second threshold corresponds to threshold 154 (FIG. 4). When the signal to noise ratio is less than the second threshold, processing proceeds to step 265, and nothing is transmitted. This corresponds to region 152 of diagram 150 (FIG. 4). When the signal to noise ratio is higher than the second threshold, soft decisions are transmitted, corresponding to region 156 of diagram 150 (FIG. 4). First soft decisions are generated in step 255, and then the soft decisions are transmitted in step 260.

Method 200, as shown in FIG. 5, is advantageous in part because a communications node can make intelligent decisions to trade bandwidth for signal quality. When signal quality is high, hard decisions are transmitted which utilized little bandwidth. When signal quality is not as high, soft decisions are transmitted, utilizing more bandwidth, but allowing for greater signal quality at the gateway.

Figure 6:
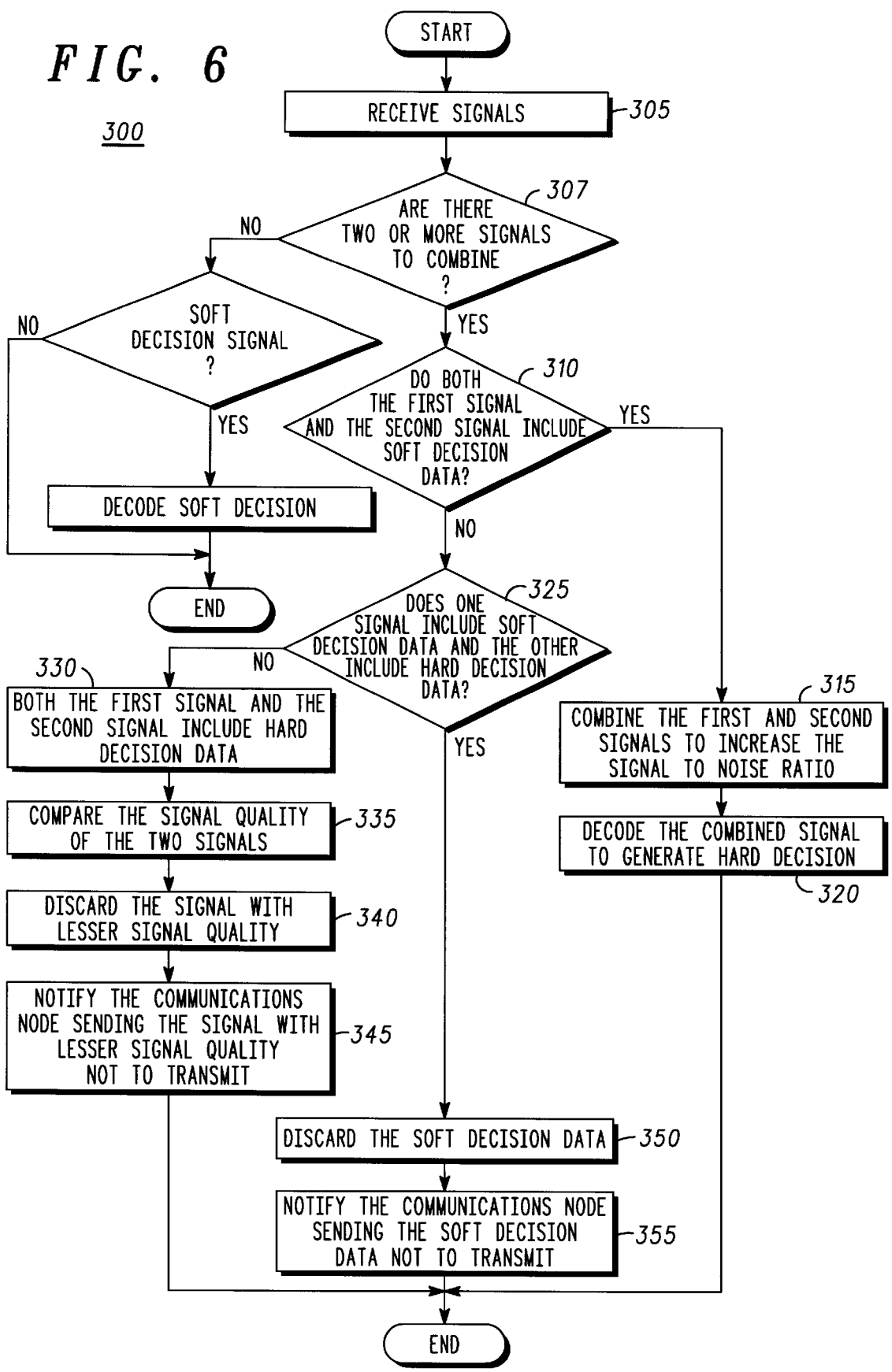
FIG. 6 shows a flow chart of a method of operating a gateway in accordance with a preferred embodiment of the present invention.

FIG. 6 shows a flow chart of a method of operating a gateway in accordance with a preferred embodiment of the present invention. Method 300 is preferably performed by a gateway in a satellite communications system, such as in gateway 100 (FIG. 3). Method 300 starts in step 305 when one or more signals are received at the gateway. Each of the signals are preferably transmitted by satellites in a satellite communications system, such as satellites 20 (FIG. 1). One embodiment of a satellite is shown as communications node 25 (FIG. 2). As previously described, each of the first and second signals can include either hard or soft decision data.

In step 307, it is determined if one or more signals are received at the gateway. If so, the process proceeds to step 310. If in step 307, it is determined that only one signal is received, the process proceeds to step 308.

In step 308, a determination is made as to whether the one signal received includes soft decision data. If so, the soft decision data is decoded in step 309.

In step 310, a determination is made as to whether both the first and second signals include soft decision data. If so, the soft decision data from each are combined in step 315, and their resulting combined signal is decoded to generate hard decisions in step 320. The operation of steps 315 and 320 correspond to gateway 100 (FIG. 3) utilizing summer 118 and decoder 120 to generate hard decisions. If in step 310, it is determined that both first and second signals do not include soft decision data, processing proceeds with step 325.

In step 325, a determination is made as to whether one signal includes soft decision data and the other signal includes hard decision data. If so, processing proceeds with step 350 where the soft decision data is discarded. Then, in step 355 the communications node sending the soft decision data is notified that the data is being discarded, and that the node should not transmit. If in step 325, the opposite determination is made, both the first signal and second signal include hard decision data, as shown in step 330. When both signals include hard decision data, method 300 decides which of the hard decisions to use by comparing the signal quality of the two signals. In step 335 the signal quality of the two signals are compared. In step 340 the signal with lesser signal quality is discarded. Then, in step 345, the communications node sending the discarded signal is notified not to transmit. In addition, a threshold can be added to the notification process included in steps 345 and 355. If the SNR is not sufficiently high to guarantee that the satellite will continue sending hard decisions, then no notification is sent and the gateway continues to receive signals from both satellites.

In summary, the method and apparatus of the present invention provides an advantageous means for trading off bandwidth in return for increased link margin from a subscriber unit to a satellite in a satellite communications system. While we have shown and described specific embodiments of the present invention, further modifications and improvements will occur to those skilled in the art. For example, the method and apparatus of the present invention have been described primarily in the context of satellite communications systems; however, the method and apparatus of the present invention are applicable to any communications system that includes path diversity. We desire it to be understood, therefore, that this invention is not limited to the particular forms shown and we intend in the appended claims to cover all modifications that do not depart from the spirit and scope of this invention.

What is claimed is:

1. A method of operating a communications node, said method comprising the steps of:
   receiving a signal having a signal to noise ratio;
   comparing the signal to noise ratio to a first threshold; and
   when the signal to noise ratio is above the first threshold, quantizing the signal to generate soft decisions, decoding the soft decisions to generate hard decisions, and transmitting the hard decisions, the step of quantizing comprising quantizing an in-phase component of the signal; and quantizing a quadrature component of the signal.

2. A method of operating a communications node, the method comprising the steps of:
   receiving a signal having a signal to noise ratio;
   comparing the signal to noise ratio to a first threshold;
   when the signal to noise ratio is above the first threshold, quantizing the signal to generate soft decisions, decoding the soft decisions to generate hard decisions, and transmitting the hard decisions;
   when the signal to noise ratio is below the first threshold, quantizing the signal to generate soft decisions, and transmitting the soft decisions;
   receiving a communication from a second communications node which has also received the signal; and
   responsive to the communication, refraining from transmitting either hard or soft decisions.

3. The method of claim 2 wherein the first communications node and the second communications node are satellites.

4. The method of claim 2 wherein the first communications node and the second communications node are terrestrial transceivers.

5. A method of operating a communications node, the method comprising the steps of:
   receiving a signal having a signal to noise ratio;
   comparing the signal to noise ratio to a first threshold;
   when the signal to noise ratio is above the first threshold, quantizing the signal to generate soft decisions, decoding the soft decisions to generate hard decisions, and transmitting the hard decisions;
   comparing the signal to noise ratio to a second threshold, wherein said first threshold is greater than said second threshold;
   when the signal to noise ratio is less than the second threshold, refraining from transmitting either hard or soft decisions;
   when the signal to noise ratio is between the first threshold and the second threshold, quantizing the signal to generate soft decisions, and transmitting the soft decisions;
   receiving a communication from a second communications node which has also received the signal; and
   responsive to the communication, refraining from transmitting either hard or soft decisions.

6. The method of claim 5 wherein the step of quantizing comprises the steps of:
   quantizing an in-phase component of the signal; and
   quantizing a quadrature component of the signal.

7. The method of claim 5 wherein the first communications node and the second communications node are satellites.

8. The method of claim 5 wherein the first communications node and the second communications node are terrestrial transceivers.

9. A method of operating a gateway in a satellite communications system, said method comprising the steps of:
   receiving a first signal transmitted from a first satellite;
   receiving a second signal transmitted from a second satellite;
   when the first signal and the second signal include soft decision data, combining the first and second signals, thereby generating a combined signal with an increased signal to noise ratio; and
   when the first signal and the second signal include hard decisions data, notifying tie second satellite that the second signal need not be transmitted, thereby reducing the use of bandwidth.

10. A method of operating a gateway in a satellite communications system, said method comprising the step of:
    receiving a first signal transmitted from a first satellite;
    receiving a second signal transmitted from a second satellite;
    when the first signal and the second signal include soft decision data, combining the first and second signals, thereby generating a combined signal with an increased signal to noise ratio;

when the first signal and the second signal include hard decision data, comparing a signal quality of the first signal and a signal quality of the second signal; and discarding one of the first signal and the second signal, said one having the lesser signal quality.

11. A method of operating a gateway in a satellite communications system, said method comprising the steps of:

receiving a first signal transmitted from a first satellite;

receiving a second signal transmitted from a second satellite;

when the first signal and the second signal include soft decision data, combining the first and second signals, thereby generating a combined signal with an increased signal to noise ratio; and wherein the first and second signals are each comprised of an in-phase component and a quadrature component, and the step of combining comprises the steps of:

summing the in-phase component of the first signal with the in-phase component of the second signal; and summing the quadrature component of the first signal with the quadrature component of the second signal.

12. The method of claim 11 futher comprising the step of:

decoding the combined signal to generate hard decisions.

13. A satellite communications system comprising:

a first satellite which receives a user transmission having a first signal quality, performs symbol decisions, and transmits either hard decision data or soft decision data as a function of the first signal quality;

a gateway which receives the soft decision data or the hard decision data from the first satellite; and a second satellite which also receives the user transmission having a second signal quality, performs symbol decisions, and transmits either hard decision data or soft decision data as a function of the second signal quality, wherein the gateway receives the soft decision data or the hard decision data from the second satellite.

14. The satellite communications system of claim 13 wherein the gateway sums soft decision data from the first satellite with soft decision data from the second satellite.

15. The satellite communications system of claim 13 wherein the gateway compares the hard decision data from the first satellite against the hard decision data from the second satellite.

* * * * *